United States Patent

Saito et al.

(10) Patent No.: US 10,640,416 B2
(45) Date of Patent: May 5, 2020

(54) ALKALI-FREE GLASS SUBSTRATE (71) Applicant: AGC INC., Tokyo (JP)

(72) Inventors: Kenta Saito, Tokyo (JP); Daisuke Kobayashi, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 15/937,316

(22) Filed: Mar. 27, 2018

(65) Prior Publication Data

US 2018/0282202 A1 Oct. 4, 2018

(30) Foreign Application Priority Data

Mar. 31, 2017 (JP) ................................. 2017-070448

(51) Int. Cl.
| | |
|---|---|
| *C03C 3/091* | (2006.01) |
| *B24B 1/00* | (2006.01) |
| *C03B 5/187* | (2006.01) |
| *C03B 25/02* | (2006.01) |
| *C03B 18/02* | (2006.01) |

(52) U.S. Cl.
CPC .............. *C03C 3/091* (2013.01); *B24B 1/00* (2013.01); *C03B 5/187* (2013.01); *C03B 18/02* (2013.01); *C03B 25/025* (2013.01)

(58) Field of Classification Search
CPC ................................. C03C 3/091; C03B 18/02
USPC ........................................................ 428/220
See application file for complete search history.

(56) References Cited

U.S. PATENT DOCUMENTS

| | | | | |
|---|---|---|---|---|
| 2002/0010065 | A1* | 1/2002 | Masumura | C03C 3/091 501/57 |
| 2004/0241557 | A1* | 12/2004 | Bellman | C03C 3/064 430/5 |
| 2006/0081008 | A1* | 4/2006 | Hirata | C03B 19/1453 65/111 |
| 2007/0197366 | A1* | 8/2007 | Aoki | C03B 5/16 501/11 |
| 2009/0270242 | A1 | 10/2009 | Yanase et al. | |
| 2010/0323871 | A1 | 12/2010 | Koike et al. | |
| 2011/0028299 | A1 | 2/2011 | Saitou et al. | |
| 2013/0029830 | A1 | 1/2013 | Koyama et al. | |
| 2013/0116108 | A1* | 5/2013 | Cassingham | C03C 1/02 501/54 |

(Continued)

FOREIGN PATENT DOCUMENTS

| | | |
|---|---|---|
| JP | H03-065529 A | 3/1991 |
| JP | 2014-005199 A | 1/2014 |

(Continued)

OTHER PUBLICATIONS

Tokunaga, Flass-Substrate Finish-Polishing Method and Alkali-Free Glass Substrate that has been Finish-Polished by said Method, Nov. 6, 2015, EPO, whole document (Year: 2015).*

*Primary Examiner* — Tahseen Khan
(74) *Attorney, Agent, or Firm* — Foley & Lardner LLP (57) ABSTRACT

The present invention relates to an alkali-free glass substrate, having a difference Δn between the maximum value and the minimum value of a refractive index at a cross-section of a glass sheet of $0.40 \times 10^{-5}$ or less. According to the alkali-free glass substrate of the present invention, the polishing ability can be extremely improved and the polishing time is shortened, so that the production efficiency can be improved.

12 Claims, 4 Drawing Sheets

(56) References Cited

U.S. PATENT DOCUMENTS

| | | | |
|---|---|---|---|
| 2013/0160493 A1 | 6/2013 | Hamamoto et al. | |
| 2014/0249019 A1 | 9/2014 | Koyama et al. | |
| 2017/0023726 A1* | 1/2017 | Wada | C03C 3/083 |
| 2017/0183255 A1* | 6/2017 | Walther | C03C 3/083 |
| 2017/0327408 A1 | 11/2017 | Nomura et al. | |
| 2017/0329192 A1 | 11/2017 | Ono et al. | |
| 2017/0355637 A1 | 12/2017 | Nomura et al. | |

FOREIGN PATENT DOCUMENTS

| | | | | |
|---|---|---|---|---|
| JP | 2016-113363 A | 6/2016 | | |
| JP | 2016-199467 A | 12/2016 | | |
| JP | 2017-030976 A | 2/2017 | | |
| WO | WO-2012-002031 A1 | 1/2012 | | |
| WO | WO-2015083713 A1 * | 6/2015 | ............. | C03C 3/091 |
| WO | WO-2016-084952 A1 | 6/2016 | | |
| WO | WO-2016-125792 A1 | 8/2016 | | |

\* cited by examiner

ALKALI-FREE GLASS SUBSTRATE

FIELD OF THE INVENTION

The present invention relates to an alkali-free glass substrate which is suitable as a glass substrate for various kinds of displays and a glass substrate for magnetic disks.

BACKGROUND OF THE INVENTION

As a glass substrate for various kinds of displays, particularly, a glass substrate in which a metal or oxide thin film is formed on the surface thereof, it is preferable to use an alkali-free glass substrate which does not substantially contain alkali metal ions since alkali metal ions are diffused into the thin film to degrade film characteristics when an alkali metal oxide is contained.

The alkali-free glass substrate to be used for the above-described purpose is obtained by: heating and melting raw materials, which has been mixed in a predetermined mixing ratio, in a melting furnace to achieve vitrification; clarifying the molten glass; subsequently forming a glass ribbon having a predetermined thickness by a float process or a fusion process; and cutting the glass ribbon into a predetermined shape.

On the surface of a glass sheet obtained by forming by the float process or fusion process, minute irregularity and undulation such as distortion and corrugation are present.

In case of the distortion, thickness subtly varies at the parts where the minute irregularity and undulation are present and the distortion is mainly attributable to local heterogeneity of the composition of the molten glass. The distortion becomes noticeable through enlargement of a difference between viscosity characteristics based on the heterogeneous composition of the molten glass as the glass ribbon is thinly drawn in a planar manner. A basic countermeasure against the distortion is to improve the homogeneity of the molten glass.

On the other hand, in case of the corrugation, although the thickness is substantially constant, the minute irregularity and undulation wave at a fine pitch in a width direction of the glass ribbon and it is considered that the corrugation is generated in the process of thinly drawing the glass ribbon in a planar manner in the width direction and in the flow direction mainly in the forming process. A basic countermeasure against the corrugation is to adjust a tensile force in the width direction of the glass ribbon and a traction force in the flow direction.

Such minute irregularity and undulation do not become a major problem in the case where the glass substrate is used as a glass sheet for automobiles, buildings, and the like but the minute irregularity and undulation become a cause of imparting distortion and color unevenness to images on a display to be fabricated in the case where it is used as a glass substrate for various displays. Therefore, particularly, in the case where a glass sheet formed by the float process is used as a glass substrate for a display, it is necessary to remove the minute irregularity and undulation by polishing the surface of the glass sheet.

On the surface of the glass sheet after forming, the minute irregularity and undulation remain. Among them, it is conventionally considered that undulation height at a 20 mm pitch imparts a large influence on polishing ability of the glass sheet and quality of a liquid crystalline display. For example, in Patent Document 1, for the purpose of improving the polishing ability, there is disclosed a method for manufacturing a glass substrate in which a float glass whose undulation height at a 20 mm pitch is 0.3 μm or less is selected.

Patent Document 1: JP-A-3-65529

SUMMARY OF THE INVENTION

However, in the conventional glass sheet, in order to reduce image distortion or color unevenness on a display fabricated in the case of using the glass sheet as a glass substrate for various displays, it is necessary to increase a removal amount in polishing, and there is a problem that production efficiency may decrease owing to prolonged polishing time. Particularly, the minute irregularity and undulation attributable to distortion lowers the production efficiency.

In order to solve the aforementioned problem of the conventional techniques, an object of the present invention is to provide an alkali-free glass substrate which can extremely improve the polishing ability.

In order to achieve the above-described object, the present invention provides an alkali-free glass substrate, having a difference $\Delta n$ between the maximum value and the minimum value of a refractive index at a cross-section of a glass sheet of $0.40 \times 10^{-5}$ or less.

In the alkali-free glass substrate of the present invention, it is preferable that the $\Delta n$ is $0.30 \times 10^{-5}$ or less.

In the alkali-free glass substrate of the present invention, it is more preferable that the $\Delta n$ is $0.20 \times 10^{-5}$ or less.

In the alkali-free glass substrate of the present invention, it is preferable that undulation height on both main surfaces of the alkali-free glass substrate in terms of undulation at a 20 mm pitch is 0.13 μm or less.

In the alkali-free glass substrate of the present invention, it is more preferable that the undulation height on the both main surfaces of the alkali-free glass substrate in terms of undulation at a 20 mm pitch is 0.10 μm or less.

In the alkali-free glass substrate of the present invention, it is preferable that undulation pitch on the both main surfaces is from 5 mm to 30 mm.

In the alkali-free glass substrate of the present invention, it is preferable that a ratio of the undulation height on the both main surfaces of the alkali-free glass substrate in terms of undulation at a 20 mm pitch to the undulation pitch on the both main surfaces, (undulation height in terms of a 20 mm pitch/undulation pitch), is $1.3 \times 10^{-5}$ or less.

In the alkali-free glass substrate of the present invention, it is preferable that a thickness thereof is 1.0 mm or less.

In the alkali-free glass substrate of the present invention, it is more preferable that the thickness thereof is 0.45 mm or less.

In the alkali-free glass substrate of the present invention, it is preferable that a substrate size thereof is (2,100 mm×2,400 mm) or more.

In the alkali-free glass substrate of the present invention, it is more preferable that the substrate size is (2,900 mm×3,200 mm) or more.

It is preferable that the alkali-free glass substrate of the present invention is a glass substrate for displays.

It is preferable that the alkali-free glass substrate of the present invention is a float glass.

It is preferable that the alkali-free glass substrate of the present invention includes, in terms of mass % on the basis of oxides, $SiO_2$: from 54 to 73%, $Al_2O_3$: from 10.5 to 24%, $B_2O_3$: from 0.1 to 12%, MgO: from 0 to 8%, CaO: from 0 to 14.5%, SrO: from 0 to 24%, BaO: from 0 to 13.5%, and $ZrO_2$: from 0 to 5%, provided that the total amount of MgO, CaO, SrO and BaO (MgO+CaO+SrO+BaO): from 8 to 29.5%.

It is preferable that the alkali-free glass substrate of the present invention includes, in terms of mass % on the basis of oxides, $SiO_2$: from 58 to 66%, $Al_2O_3$: from 15 to 22%, $B_2O_3$: from 5 to 12%, MgO: from 0 to 8%, CaO: from 0 to 9%, SrO: from 0 to 12.5%, and BaO: from 0 to 2%, provided that the total amount of MgO, CaO, SrO and BaO (MgO+CaO+SrO+BaO): from 9 to 18%.

It is preferable that the alkali-free glass substrate of the present invention includes, in terms of mass % on the basis of oxides, $SiO_2$: from 54 to 73%, $Al_2O_3$: from 10.5 to 22.5%, $B_2O_3$: from 0.1 to 5.5%, MgO: from 0 to 8%, CaO: from 0 to 9%, SrO: from 0 to 16%, and BaO: from 0 to 9%, provided that the total amount of MgO, CaO, SrO and BaO (MgO+CaO+SrO+BaO): from 8 to 26%.

According to the alkali-free glass substrate of the present invention, the polishing ability can be extremely improved and the polishing time is shortened, so that the production efficiency can be improved.

DETAILED DESCRIPTION OF THE INVENTION

The alkali-free glass substrate in one embodiment of the present invention is described below.

In an alkali-free glass substrate of the present invention, a difference $\Delta n$ between the maximum value and the minimum value of the refractive index at a cross-section of the glass sheet is $0.40 \times 10^{-5}$ or less.

In the present description, the cross-section of a glass sheet refers to a cross-section in the thickness direction of the glass sheet.

In the alkali-free glass substrate of the present invention, the reason why $\Delta n$ is limited to the above range is as described below.

As mentioned above, among surface properties of the glass sheet after forming, it is known that undulation height at a 20 mm pitch contributes an improvement of the polishing ability of the glass sheet.

Through extensive studies on the surface properties of an alkali-free glass substrate, the present inventors have found that the difference $\Delta n$ between the maximum value and the minimum value of the refractive index at a cross-section of the glass sheet has relevance to the undulation height at a 20 mm pitch. For this point, FIG. 4 of Examples to be mentioned later shows that there is a linear correlation between $\Delta n$ and the undulation height at a 20 mm pitch.

In the present invention, since minute irregularity and undulation attributable to distortion can be reduced by controlling $\Delta n$ of an alkali-free glass substrate to $0.40 \times 10^{-5}$ or less, polishing ability of the alkali-free glass substrate is extremely improved.

Here, in the case of a fusion glass, $\Delta n$ of the alkali-free glass substrate of the present invention is a value that $\Delta n$'s at a mating surface formed in the forming process and at peripheral regions thereof are excluded. It is because the mating surface is formed at a central part in the thickness direction of the alkali-free glass substrate and, since foreign matters and the like are contained in the vicinity thereof, it is difficult to control $\Delta n$ to $0.40 \times 10^{-5}$ or less. Moreover, it is because $\Delta n$ of the mating surface does not have relevance to the undulation height at a 20 mm pitch, unlike $\Delta n$ of the present invention.

Incidentally, the peripheral regions mean regions 20% apart from the mating surface toward the both main surfaces in the thickness direction. For example, in the case where the thickness is 0.5 mm, regions 0.1 mm apart from the mating surface toward each of the both main surfaces in the thickness direction are the peripheral regions.

The measurement of $\Delta n$ can be performed, for example, using a transmittance two-beam interference microscope. For example, it can be measured by the following procedure.

(Measurement Method of $\Delta n$)

Preparation of Measurement Sample

Figure 1:
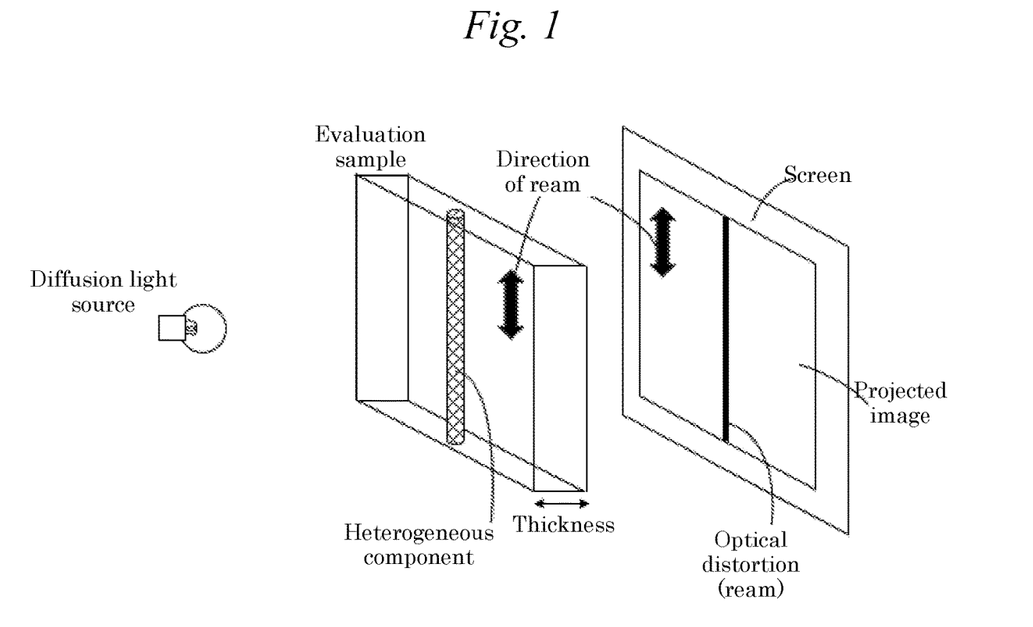
FIG. 1 is an explanatory drawing of a preparation procedure of an evaluation sample.
Figure 2A:
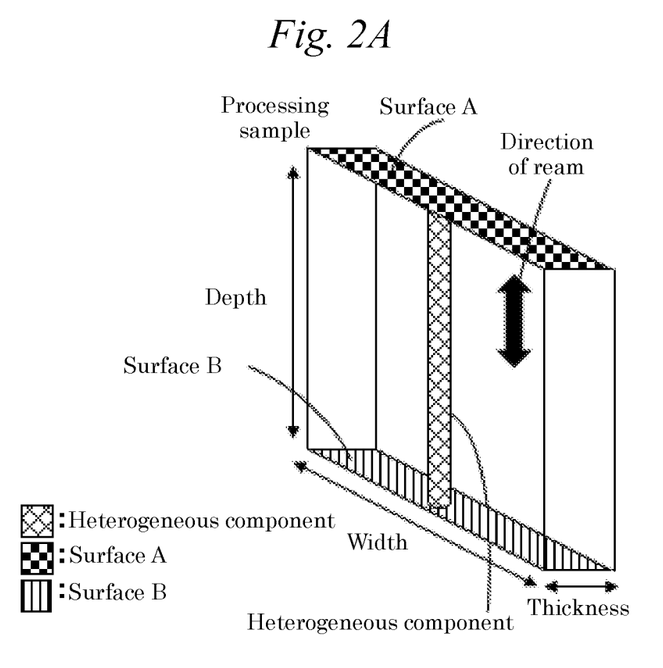
FIG. 2A is an explanatory drawing of a processed sample.

Light is irradiated from a diffusion light source to one main surface of an alkali-free glass substrate (evaluation sample), a transmitted light is projected to a screen, and the direction of ream that is observed as optical distortion is specified (see FIG. 1). From the alkali-free glass substrate, a processing sample is cut out so as to contain two surfaces (Surface A and Surface B) perpendicular to the direction of the optical distortion (ream) at a planar view, for example, in a size of a width of 30 mm or more and a depth (distance between Surface A and Surface B) of 10 mm or more (see FIG. 2A). Here, the phrase "perpendicular to the direction of the optical distortion (ream)" includes the case where the angle between the ream direction specified as mentioned above and the two surfaces (surface A and surface B) is 90±2 degrees.

Next, the surfaces A and B of the processing sample is grounded using a diamond wheel as a grinding stone. The above grinding is performed at 4 stages with changing grinding amounts of the surfaces A and B and mesh size of the diamond wheel, as shown in Table 1. Subsequently, the surfaces A and B of the processing sample after grinding is mirror-polished using a diamond slurry to obtain a measurement sample (see FIG. 2B). The removal amount is 10 μm or more and, as the diamond slurry, for example, a slurry containing 0.1 mass % of single crystal diamond of mesh size #14000 is used.

The cross-section of the glass sheet in one embodiment of the present invention corresponds to the surface A or B of the measurement sample obtained according to the above-described procedure.

Incidentally, the above-mentioned depth is determined so that a phase difference generated from a difference in the refractive index between a heterogeneous component that is a cause of ream generation and a peripheral glass becomes, for example, $\frac{1}{5}\lambda$ or less. Here, the peripheral glass means a glass at a position apart by e.g., from 10 μm to 20 μm from the heterogeneous component.

The heterogeneous component in the present description refers to a component that results from a glass component which is not sufficiently homogenized and heterogeneously exists or a component originated from the molten glass, which is produced by the reaction of the molten glass with a furnace material or a gas phase.

TABLE 1

|  | Grinding amount of Surfaces A and B | Mesh size of diamond wheel |
| --- | --- | --- |
| First stage | 2,000 μm or more | #100 |
| Second stage | 200 μm or more | #400 |
| Third stage | 100 μm or more | #1000 |
| Fourth stage | 50 μm or more | #2000 |

Measurement of Δn

For the measurement of Δn, a transmittance two-beam interference microscope is used. In Examples to be mentioned later, the measurement was performed at a space resolution of 9.1 μm×9.1 μm (corresponding to CCD camera four pixels) using a transmittance two-beam interference microscope (TD series) manufactured by K.K. Mizojiri Kogaku Kogyosho and using 546 nm (light source: xenon lamp, monochromatic filter: 546 nm) as a measurement wavelength.

At the time of measuring minute irregularity and undulation, it is necessary to eliminate factors that may worsen measurement accuracy. For example, it is necessary to achieve the suppression of temperature variation in the vicinity of the apparatus, prevention of vibration, and shielding of external light (e.g., illumination).

Moreover, depending on the objective lens to be used, there are a case where measurement accuracy varies and a case where accuracy distribution is present within a measurement surface. Therefore, a phase difference distribution in a state that nothing is present on an optical path (plane inclination correction) is measured and the plane inclination correction is performed so that a difference between the maximum value and the minimum value within the measurement surface becomes $1/100\lambda$ or less (5 nm or less).

Figure 2B:
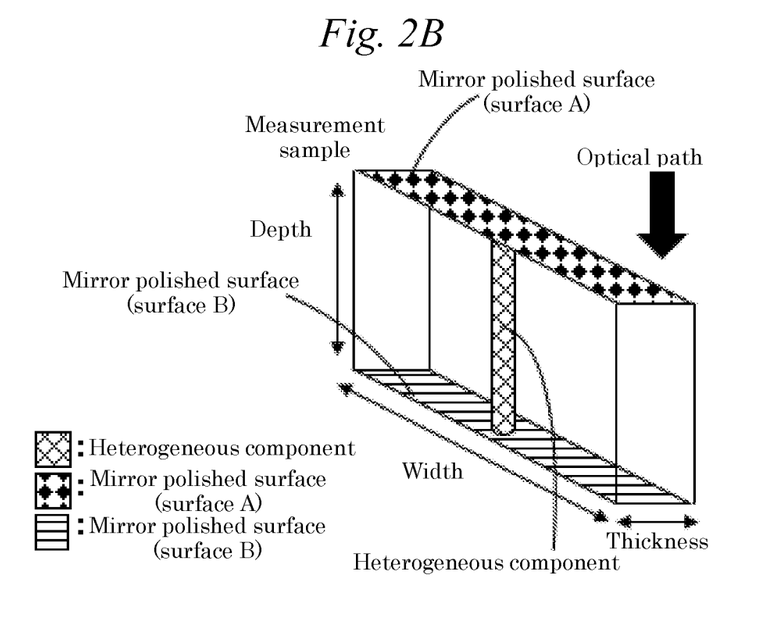
FIG. 2B is an explanatory drawing of a measurement sample.

Then, a measurement sample is placed so that the depth direction becomes the optical path, and the phase difference distribution is measured under the aforementioned conditions (plane inclination correction) (see FIG. 2B). The depth of the measurement sample is measured by a micrometer and a refractive index distribution (=Phase difference distribution/Depth) is calculated from the phase difference distribution.

The refractive index difference distribution on the mirror-polished surface A is calculated and a difference between the maximum value and the minimum value is taken as Δn.

In the alkali-free glass substrate of the present invention, Δn is preferably $0.36\times10^{-5}$ or less, more preferably $0.30\times10^{-5}$ or less, still more preferably $0.20\times10^{-5}$ or less.

Incidentally, in the alkali-free glass substrate of the present invention, an absolute value of the refractive index measured at D-line of a wavelength of 546 nm is preferably from 1.45 to 1.60.

Moreover, in the alkali-free glass substrate of the present invention, undulation height on the both main surfaces in terms of undulation at a 20 mm pitch is preferably 0.13 μm or less in view of improving the polishing ability, and more preferably 0.10 μm or less.

As mentioned above, the cause of ream generation is a heterogeneous component present in the glass. The viscosity of the molten glass varies between a portion where such a heterogeneous component is present and the other portions. For example, the portion where the heterogeneous component is present has higher viscosity than the other portions or the portion where the heterogeneous component is present has lower viscosity than the other portions.

When a portion having different viscosity is present in the molten glass, there is a case where a portion having different thickness is generated in the glass after forming. In the case where the portion where the heterogeneous component is present has higher viscosity than the other portions, in the glass after forming, the thickness at the portion becomes large. In the case where the portion where the heterogeneous component is present has lower viscosity than the other portions, in the glass after forming, the thickness at the portion becomes small. The local unevenness of the thickness in the glass after forming generates undulation on the main surface of the glass after forming. The size of the undulation height present on the main surface of the glass influences the polishing ability of the alkali-free glass substrate.

Figure 3:
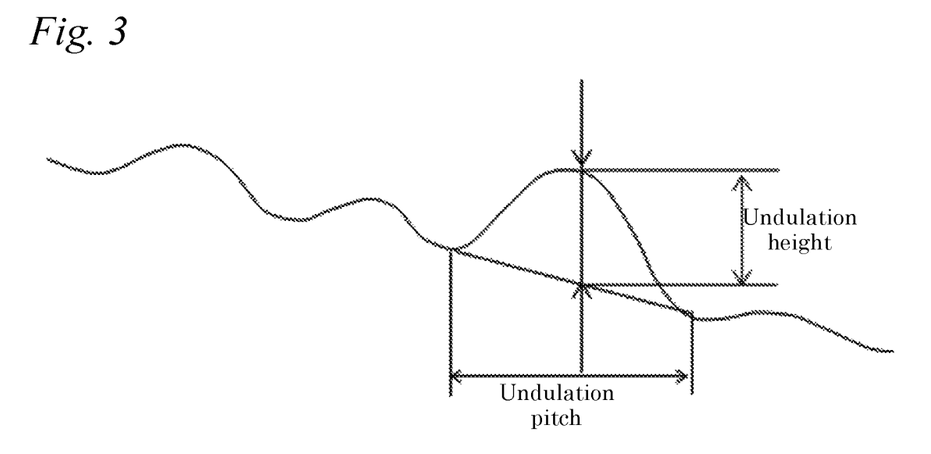
FIG. 3 is a view showing a relationship between undulation height and undulation pitch.

Incidentally, the undulation height in terms of undulation at a 20 mm pitch is determined by linear regression of a relationship between the undulation height obtained by measurement and the undulation pitch (see FIG. 3). Specifically, for example, it can be measured by the method described in the paragraph [0048] of JP-T-2013-183539.

In the alkali-free glass substrate of the present invention, the undulation height on the both main surfaces in terms of undulation at a 20 mm pitch is preferably 0.07 μm or less after polishing.

Further, in the alkali-free glass substrate of the present invention, surface roughness after polishing is preferably 0.30 nm or less as arithmetical average roughness (Ra).

Moreover, in the alkali-free glass substrate of the present invention, the undulation pitch on the both main surfaces is preferably from 5 mm to 30 mm.

Furthermore, in the alkali-free glass substrate of the present invention, a ratio of the undulation height on the both main surfaces in terms of undulation at a 20 mm pitch to the undulation pitch on the both main surfaces (undulation height in terms of a 20 mm pitch/undulation pitch) is preferably $1.3\times10^{-5}$ or less.

In the alkali-free glass substrate of the present invention, the thickness thereof is preferably 1.0 mm or less in view of using it as a glass substrate for various displays or a glass substrate for magnetic disks, more preferably 0.75 mm or less, and still more preferably 0.45 mm or less.

Further, in the alkali-free glass substrate of the present invention, a substrate size thereof is preferably (2,100 mm×2,400 mm) or more, more preferably (2,800 mm×3,000 mm) or more, and still more preferably (2,900 mm×3,200 mm) or more.

Moreover, the alkali-free glass substrate of the present invention is preferably a float glass. It is because, in the case of using it as a glass substrate for displays, the polishing of the both main surfaces is not necessary for a fusion glass but the polishing of at least one main surface is necessary for the float glass. Incidentally, in the float glass, the main surface on which polishing is necessary refers to the surface at which the glass ribbon comes into contact with molten tin in a float bath.

The alkali-free glass substrate of the present invention is preferably an alkali-free borosilicate glass. It is because, since a boron component in a molten glass is prone to vaporize in the process of melting or clarification of a glass raw material in the case of a borosilicate glass, the molten glass becomes heterogeneous and striae and ream are prone to occur in the alkali-free glass substrate to be finally obtained. Further, the borosilicate glass preferably has an $SiO_2$ content of from 54 to 73 mass % and a $B_2O_3$ content of from 0.1 to 12 mass %. The borosilicate glass may be an aluminoborosilicate glass.

As long as an alkali component is substantially (i.e., excluding unavoidable impurity) not contained, the alkali-free glass substrate of the present invention can be appropriately selected from a wide range of compositions but preferably includes, in terms of mass % on the basis of oxides, $SiO_2$: from 54 to 73% (preferably from 54 to 66%),
$Al_2O_3$: from 10.5 to 24%,
$B_2O_3$: from 0.1 to 12%,
MgO: from 0 to 8%,
CaO: from 0 to 14.5%,
SrO: from 0 to 24%,
BaO: from 0 to 13.5%, and
$ZrO_2$: from 0 to 5%,
provided that MgO+CaO+SrO+BaO: from 8 to 29.5% (preferably from 9 to 29.5%).

In the case where both of a high strain point and a high solubility are achieved, the alkali-free glass substrate preferably includes, in terms of mass % on the basis of oxides, $SiO_2$: from 58 to 66%, $Al_2O_3$: from 15 to 22%, $B_2O_3$: from 5 to 12%, MgO: from 0 to 8%, CaO: from 0 to 9%, SrO: from 0 to 12.5%, and BaO: from 0 to 2%, provided that MgO+CaO+SrO+BaO: from 9 to 18%.

In the case where a particularly high strain point is intended to obtain, the alkali-free glass substrate preferably includes, in terms of mass % on the basis of oxides, $SiO_2$: from 54 to 73%, $Al_2O_3$: from 10.5 to 22.5%, $B_2O_3$: from 0.1 to 5.5%, MgO: from 0 to 8%, CaO: from 0 to 9%, SrO: from 0 to 16%, and BaO: from 0 to 9%, provided that MgO+CaO+SrO+BaO: from 8 to 26%.

In the alkali-free glass substrate of the present invention, a temperature that becomes a standard at the melting of the glass, i.e., a temperature $T_2$ at which the viscosity of the glass reaches $10^2$ dPa·s is preferably 1,780° C. or lower. When the temperature $T_2$ is higher than 1,780° C., there is a concern that melting of the glass becomes difficult. The temperature $T_2$ is more preferably 1,700° C. or lower, and still more preferably 1,660° C. or lower.

Moreover, in the alkali-free glass substrate of the present invention, a temperature that becomes a standard at the forming of the glass, i.e., a temperature $T_4$ at which the viscosity of the glass reaches $10^4$ dPa·s is preferably 1,400° C. or lower. When the temperature $T_4$ is higher than 1,400° C., there is a concern that the forming of the glass becomes difficult. The temperature $T_4$ is more preferably 1,350° C. or lower, and still more preferably 1,310° C. or lower.

The alkali-free glass substrate of the present invention can be manufactured according to a usual method. That is, it is obtained by continuously charging a glass raw material blended so as to be the above-described composition into a melting furnace and heating it to a predetermined temperature to obtain a molten glass, subsequently forming the molten glass by a float process or a fusion process into a glass ribbon having a predetermined thickness, and then cutting the glass ribbon into a predetermined shape.

The Δn of the alkali-free glass substrate of the present invention can be decreased by adjustment such as a reduction of particle diameter of the glass raw material, elevation of the temperature of the melting furnace through an increase in the combustion output of a burner, or an increase in the gas flow of a bubbler.

Here, median particle diameter $D_{50}$ of silica sand contained in the glass raw material is preferably from 90 μm to 250 μm. By using the silica sand, the meltability of the glass raw material becomes good and the homogeneity of the molten glass can be improved. Incidentally, the median particle diameter $D_{50}$ means a particle diameter when cumulative frequency is 50% in the particle size distribution of a powder measured by a laser diffraction method.

Moreover, Δn can be decreased, in a molten glass-conveying apparatus provided between the melting furnace and the forming apparatus and fitted with a molten glass-conveying pipe and a stirrer, by adjustment such as an increase in an energization amount to the molten glass-conveying pipe to elevate the temperature of the molten glass in the vicinity of the stirrer, an increase in the stirring rate (number of revolutions) of the stirrer, or a reduction of the height of the stirrer with respect to the molten glass.

Here, the temperature of the molten glass in the vicinity of the stirrer is preferably from 1,300 to 1,500° C., and more preferably 1,350 to 1,500° C. Further, the number of revolutions of the stirrer is preferably from 5 to 30 rpm, and more preferably from 10 to 30 rpm.

Examples

The present invention is further described below using Examples and Comparative Examples. Incidentally, the present invention should not be construed as being limited to these descriptions.

A glass raw material of an alkali-free glass composition was melted in a melting furnace under production conditions of each of Examples 1 to 3 and Comparative Examples 1 to 3 shown in Table 2 to manufacture a molten glass, the molten glass was formed into a sheet-shaped glass ribbon by a float process, and the glass ribbon was annealed and cut to prepare a plurality of alkali-free glass substrates (AN100, manufactured by Asahi Glass Co., Ltd., thickness: 0.50 mm). For the alkali-free glass substrate, Δn, undulation height on a main surface in terms of undulation at a 20 mm pitch (undulation height (in terms of a 20 mm pitch)), and undulation pitch on the main surface were measured. The measurement results are shown in the following table.

TABLE 2

|  | Example 1 | Example 2 | Example 3 | Comparative Example 1 | Comparative Example 2 | Comparative Example 3 |
| --- | --- | --- | --- | --- | --- | --- |
| Δn [×10$^{-5}$] | 0.16 | 0.22 | 0.27 | 0.58 | 0.78 | 1.26 |
| Undulation height (in terms of 20 mm pitch) [μm] | 0.08 | 0.10 | 0.12 | 0.19 | 0.20 | 0.35 |
| Undulation pitch on main surface [mm] | 25 | 15 | 10 | 17 | 27 | 14 |
| Undulation height (in terms of 20 mm pitch)/ Undulation pitch [×10$^{-5}$] | 0.32 | 0.67 | 1.2 | 1.1 | 0.74 | 2.5 |
| Stirrer: temperature [° C.] | 1,450 | 1,420 | 1,420 | 1,400 | 1,350 | 1,400 |
| Stirrer: number of revolutions [rpm] | 15 | 15 | 20 | 12 | 15 | 10 |

Figure 4:
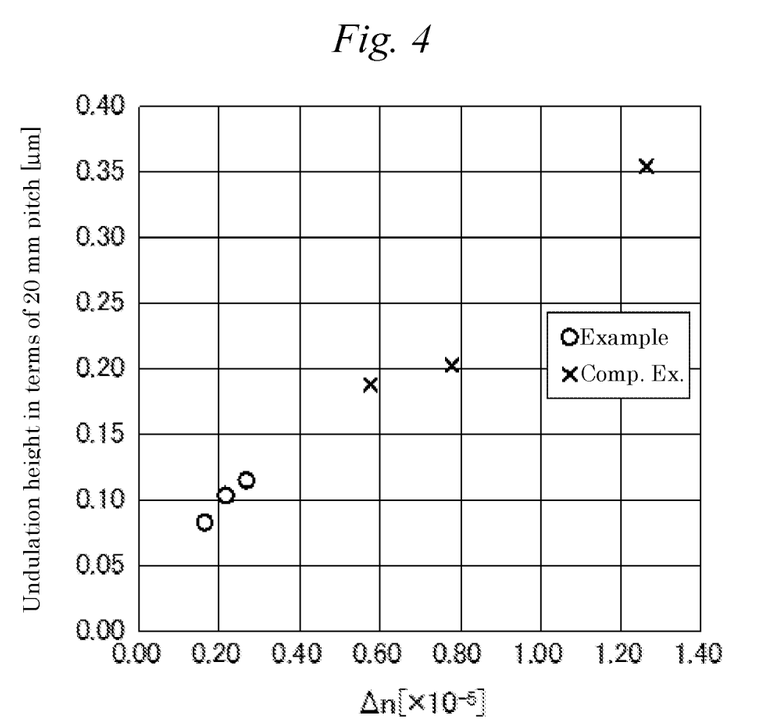
FIG. 4 is a graph showing a relationship between $\Delta n$ and undulation height in terms of a 20 mm pitch for glasses of Examples and Comparative Examples.

FIG. 4 is a graph showing a relationship between Δn and undulation height in terms of a 20 mm pitch for glasses of Examples and Comparative Examples. In FIG. 4, it is shown that there is a linear correlation between Δn and undulation height in terms of a 20 mm pitch. From the results, in a glass where Δn is $0.40\times10^{-5}$ or less, the undulation height on both main surfaces in terms of a 20 mm pitch decreases and preferably becomes 0.13 μm or less. Therefore, it can be predicted that polishing ability is extremely improved as compared with a glass where Δn is more than $0.40\times10^{-5}$ and the undulation height on both main surfaces in terms of a 20 mm pitch is large, e.g., more than 0.13 μm.

The present application is based on Japanese patent application No. 2017-070448 filed on Mar. 31, 2017, and the contents of which are incorporated herein by reference.

What is claimed is:

1. An alkali-free glass substrate for displays, having a difference Δn between the maximum value and the minimum value of a refractive index at a cross-section of a glass sheet of $0.40\times10^{-5}$ or less and having a thickness of 1.0 mm or less,
wherein the glass substrate comprises, in terms of mass % on the basis of oxides, $SiO_2$: from 54 to 73%, $Al_2O_3$: from 10.5 to 24%, $B_2O_3$: from 0.1 to 12%, MgO: from 0 to 8%, CaO: from 0 to 14.5%, SrO: from 0 to 24%, BaO: from 0 to 13.5%, and $ZrO_2$: from 0 to 5%, and a total amount of MgO, CaO, SrO and BaO is from 8 to 29.5%, and
the glass substrate has a substrate size of (2,100 mm×2,400 mm) or more.

2. The alkali-free glass substrate according to claim 1, wherein the Δn is $0.30\times10^{-5}$ or less.

3. The alkali-free glass substrate according to claim 2, wherein the Δn is $0.20\times10^{-5}$ or less.

4. The alkali-free glass substrate according to claim 1, wherein an undulation height on both main surfaces of the alkali-free glass substrate in terms of undulation at a 20 mm pitch is 0.13 μm or less.

5. The alkali-free glass substrate according to claim 4, wherein the undulation height on the both main surfaces of the alkali-free glass substrate in terms of undulation at a 20 mm pitch is 0.10 μm or less.

6. The alkali-free glass substrate according to claim 1, wherein an undulation pitch on both main surfaces of the alkali-free glass substrate is from 5 mm to 30 mm.

7. The alkali-free glass substrate according to claim 1, wherein a ratio of an undulation height on both main surfaces of the alkali-free glass substrate in terms of undulation at a 20 mm pitch to an undulation pitch on the both main surfaces is $1.3\times10^{-5}$ or less.

8. The alkali-free glass substrate according to claim 1, wherein the thickness is 0.45 mm or less.

9. The alkali-free glass substrate according to claim 1, wherein the substrate size is (2,900 mm×3,200 mm) or more.

10. The alkali-free glass substrate according to claim 1, which is a float glass.

11. The alkali-free glass substrate according to claim 1, comprising, in terms of mass % on the basis of oxides, $SiO_2$: from 58 to 66%, $Al_2O_3$: from 15 to 22%, $B_2O_3$: from 5 to 12%, MgO: from 0 to 8%, CaO: from 0 to 9%, SrO: from 0 to 12.5%, and BaO: from 0 to 2%, and the total amount of MgO, CaO, SrO and BaO is from 9 to 18%.

12. The alkali-free glass substrate according to claim 1, comprising, in terms of mass % on the basis of oxides, $SiO_2$: from 54 to 73%, $Al_2O_3$: from 10.5 to 22.5%, $B_2O_3$: from 0.1 to 5.5%, MgO: from 0 to 8%, CaO: from 0 to 9%, SrO: from 0 to 16%, and BaO: from 0 to 9%, and the total amount of MgO, CaO, SrO and BaO is from 8 to 26%.

* * * * *